No. 714,356. Patented Nov. 25, 1902.
E. F. BECKWITH.
PHOTOGRAPHIC LIGHT SCREEN.
(Application filed May 26, 1900.)
(No Model.)
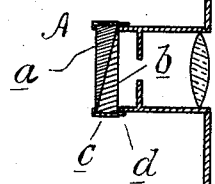
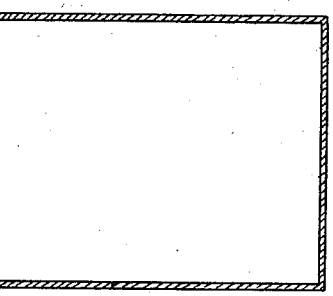
Fig. 1
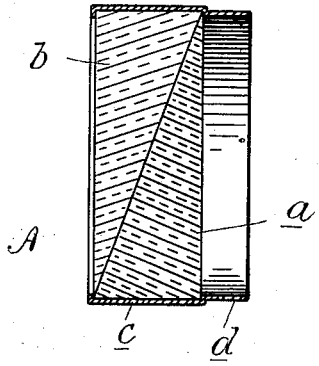
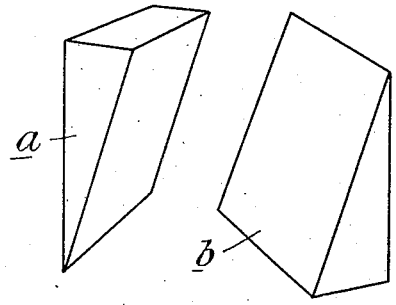
Fig. 2   Fig. 3
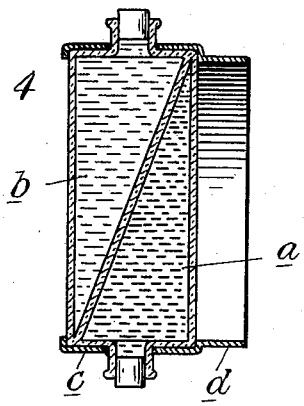
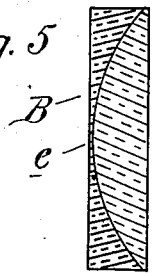
Fig. 4   Fig. 5
Witnesses
H. C. Smith
P. M. Hulbert
Inventor:
Edwin F. Beckwith
By Sprague Son
Attys.
THE NORRIS PETERS CO., PHOTO-LITHO., WASHINGTON, D. C.

UNITED STATES PATENT OFFICE.

EDWIN F. BECKWITH, OF IONIA, MICHIGAN.

PHOTOGRAPHIC LIGHT-SCREEN.

SPECIFICATION forming part of Letters Patent No. 714,356, dated November 25, 1902.

Application filed May 26, 1900. Serial No. 18,101. (No model.)

*To all whom it may concern:*

Be it known that I, EDWIN F. BECKWITH, a citizen of the United States, residing at Ionia, in the county of Ionia and State of Michigan, have invented certain new and useful Improvements in Photographic Light-Screens, of which the following is a specification, reference being had therein to the accompanying drawings.

The invention relates to light screens or filters especially designed for use in connection with photographic cameras for the purpose of qualifying the light falling upon the sensitive plate.

It is the object of the invention to obtain a graded screen by means of which the light-rays are qualified differentially to compensate for marked differences in their actinic value.

The invention consists in the peculiar combination of a graded screen and a photographic camera; further, in the peculiar construction of a screen comprising two compensating prisms, one being formed of a light-qualifying medium and the other of transparent non-qualifying medium, and, further, in the peculiar construction, arrangement, and combination of parts, as hereinafter described and claimed.

In the drawings, Figure 1 is a diagram of a camera to which the light screen or filter is applied. Fig. 2 is a section through the screen detached. Fig. 3 is a perspective view of the prisms from which the screen is formed. Fig. 4 illustrates a modified construction, and Fig. 5 illustrates another modification.

The invention is especially designed to overcome a common defect in landscape-photographs, due to the marked difference in actinic value of the light from the sky and that from the foreground. This difference consists in a gradual decrease of light through an angle of one hundred and eighty degrees from zenith to a line perpendicular to the earth, and the variation is so great that it is ordinarily impossible to time an exposure so as to obtain detail in both sky and land. Thus if the exposure is right for objects on the land the sky will be greatly overtimed and will appear perfectly flat. On the other hand, if the exposure is timed to bring out the cloud effect in the sky the landscape will be undertimed, so as to show very little detail. To obviate this defect, I have devised a graded light-screen which is adapted to differentially qualify the light falling upon the sensitive plate, so as to compensate for the natural difference in the actinic value of the rays from the sky and land.

The graded screen employed may be of any suitable construction by which a uniformly-graded qualifying effect is produced without materially impairing the transparency of the screen. Thus a screen may be formed which is tinted with the non-actinic color, such as red or yellow at one edge and then graded off toward white at the opposite edge, or, if desired, the screen may be graded from a color of low actinic value at one edge to a high actinic value at the opposite edge. It is apparent that the usefulness of a screen of this character depends largely upon the uniformity with which the color or qualifying material is graded, and if the attempt were made to produce such a screen merely by a variation in the quality of color used on different portions of the screen the result woud be unsatisfactory. I have therefore devised a construction in which a perfectly uniform graduation is obtained by employing a uniformly-colored medium, the difference in the qualifying effect being due to a variation in the thickness of said medium. Thus if a screen be formed of a uniformly-colored medium, such as glass of wedge-shaped cross-section, this would produce the desired result so far as graduation of color is concerned. It is obvious, however, that such a screen would produce a distortion in the picture, due to the refraction of the light passing through the prism. This defect I have overcome by placing adjacent to said color-prism a colorless prism, the latter being adapted to compensate for the refraction of the former, so that no distortion of the light is produced by the screen as a whole.

As shown in Figs. 1 and 2, A is a graded screen comprising a color-prism $a$ and a colorless compensating prism $b$, secured in a suitable casing $c$, which latter may be provided, if desired, with a flange, such as $d$, for securing it upon the lens-tube. The prism $a$ is preferably tinted with a light yellow and is arranged so that the rays from the sky will pass through the thickened upper end, while the rays from the ground will pass through the thinner lower end. The result will be that the actinic value of the rays from the sky is greatly reduced, so as to slow the time of exposure therefor until it more nearly equals the proper time for the landscape.

Any suitable material may be employed as a medium for the color—such, for instance, as glass; but, if desired, the prism may be formed hollow and filled with liquid, one cell containing a colored fluid and the other a colorless fluid, this construction being shown in Fig. 4.

The screens, as above described, are especially designed for use in landscape photography, in which, as above stated, the actinic value of rays falling upon the sensitive plate varies uniformly from top to bottom. For other classes of work it may be desirable to produce a different graduation—such, for instance, as shown in the modified construction, Fig. 5. In this case the color-screen B is formed with its thinned portion e in the center and increases in thickness toward the circumference, the effect being to slow the action of the light at the margin of the plate, and therefore to produce a vignette effect, being of special value when photographing a face with white drapery. Other modifications may be made which I do not deem it necessary to further illustrate.

What I claim as my invention is—

1. The combination with a photographic camera, of a graded light screen or filter arranged to differentially qualify the rays falling upon different portions of the sensitive plate.

2. A graded light filter or screen for photographic cameras, comprising a member formed of a light-qualifying medium varying in thickness, and a complementary compensating member formed of a non-qualifying medium, said screen being adapted to differentially qualify the light falling upon different portions of the sensitive plate.

3. A graded light filter or screen for photographic cameras, comprising two complementary compensating prisms, one being formed of a uniformly-tinted transparent substance and the other of a colorless transparent substance, said screen being adapted to differentially qualify the light falling upon different portions of the sensitive plate.

4. A graded light-screen for photographic cameras, comprising two complementary compensating prisms and surrounding casing for securing the same to the lens-tube, one of said prisms being formed of a uniformly-tinted transparent substance and being tapered to a thin edge and the other being formed of a colorless transparent substance.

5. A ray-filter for photographic use consisting of a transparent tapering colored medium and a transparent medium having one face parallel with that of the colored medium.

6. A ray-filter for photographic use consisting of a single piece of transparent homogeneously-colored material tapered toward one edge and a transparent medium in contact therewith having one face parallel with that of the colored material.

7. A ray-filter for photographic use embodying a transparent medium varying in density from one edge toward the other and a transparent medium in contact therewith, having its outer face parallel with the colored medium.

8. A ray-filter for photographic use embodying a single piece of transparent, colored glass tapered toward one edge and a transparent medium having one face parallel with the outer face of the colored glass.

9. In a ray-filter for photographic use, the combination with a piece of transparent colored material tapering toward one edge and a transparent cover-glass in contact therewith tapering toward the opposite edge.

10. In a ray-filter for photographic use, the combination with a casing adapted for application to a lens-tube, of a screen formed of transparent colored material extending transversely of the tube and tapering toward one edge, a piece of transparent glass in contact with the screen tapering correspondingly toward the opposite edge.

11. In a camera and in combination with the lens, of a graded light-screen arranged in front of the lens to differentially restrict actinic rays of light passing through the lens.

In testimony whereof I affix my signature in presence of two witnesses.

EDWIN F. BECKWITH.

Witnesses:
W. B. HEATH,
LEE YATES.